United States Patent Office 2,798,761
Patented July 9, 1957

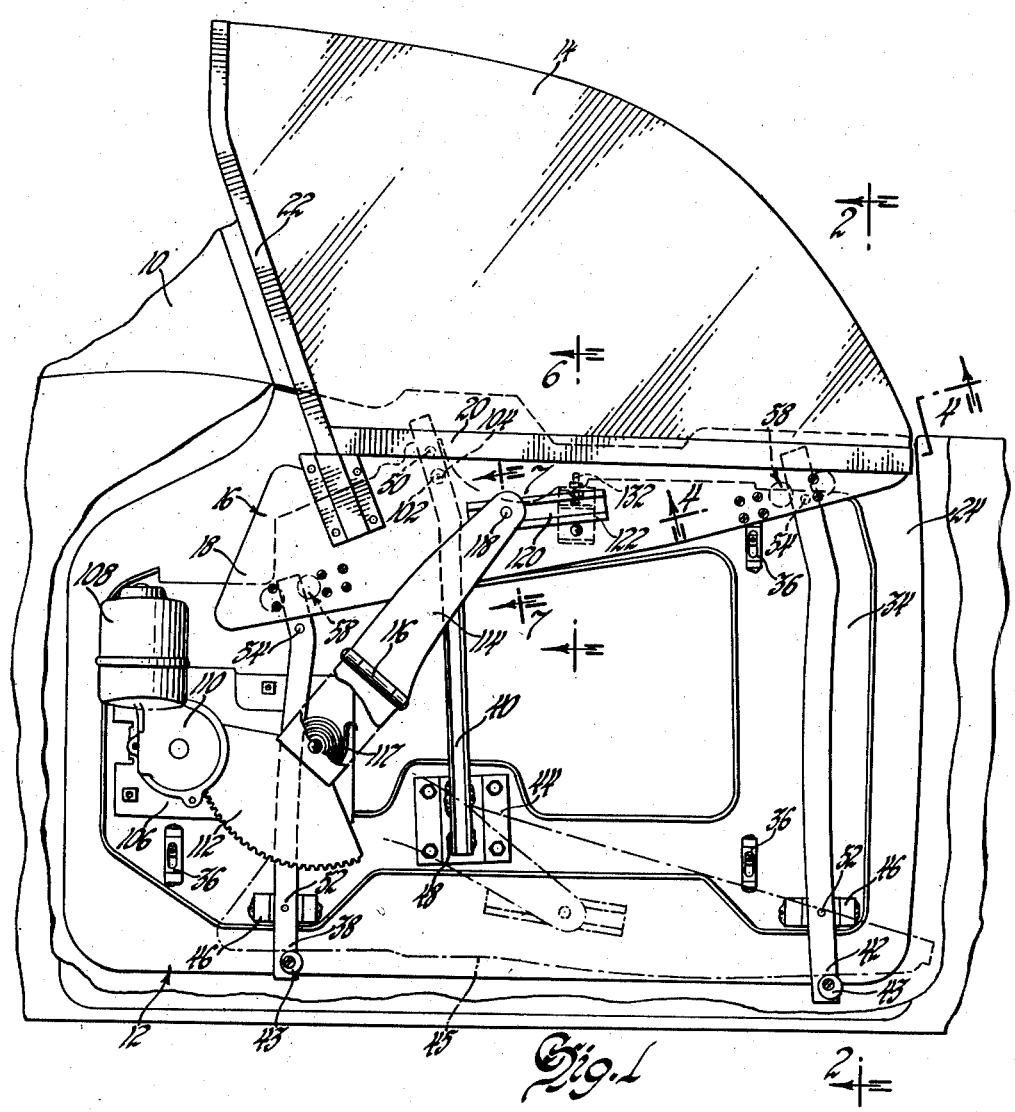

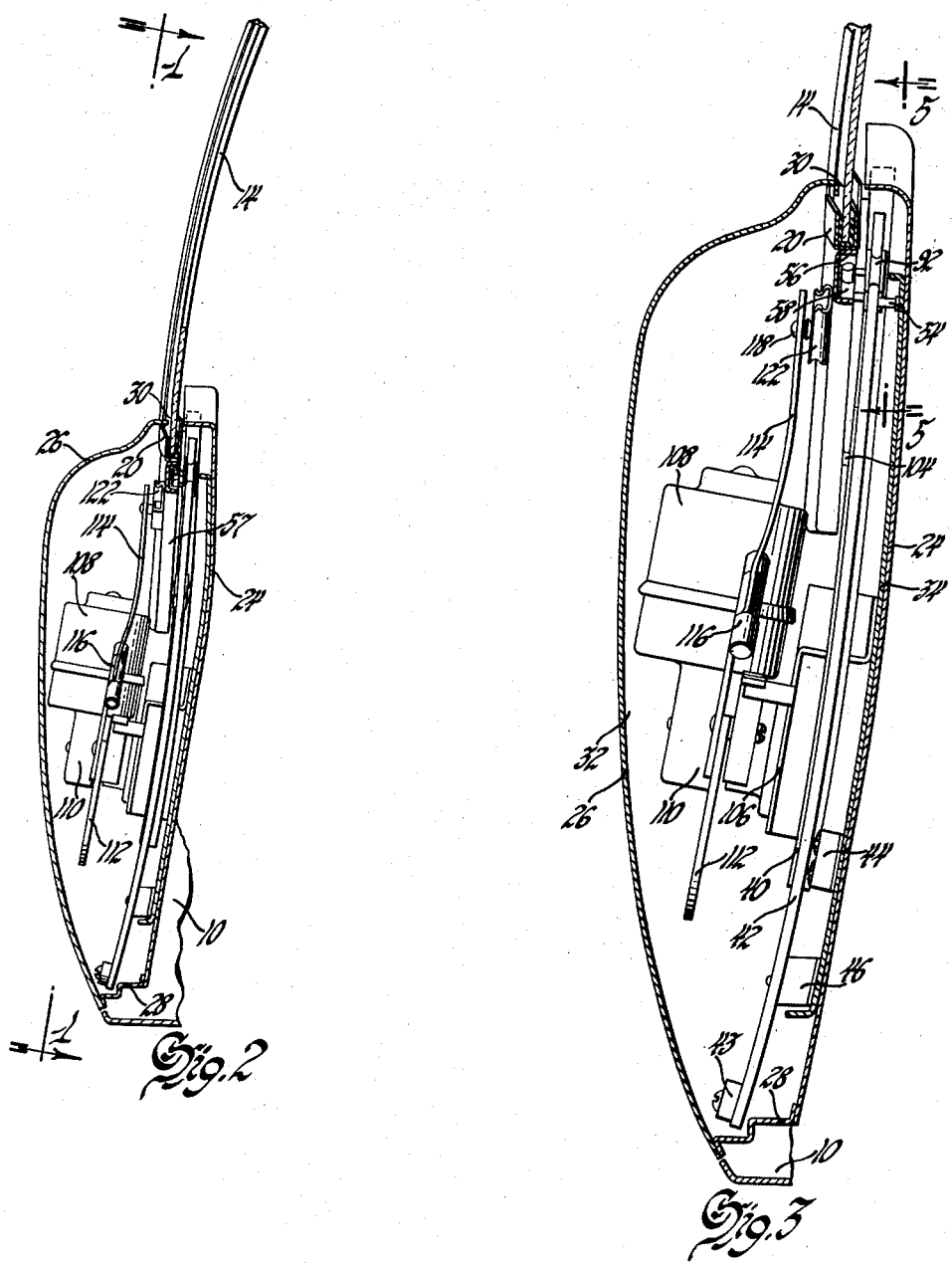

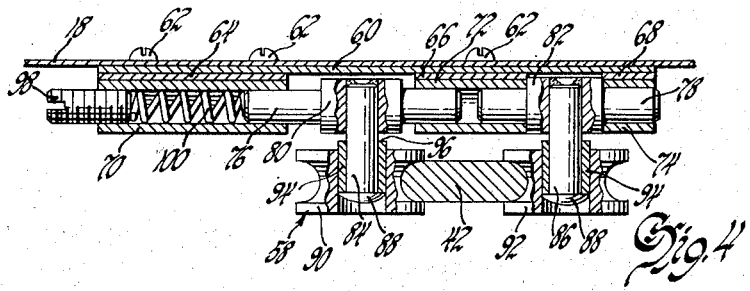
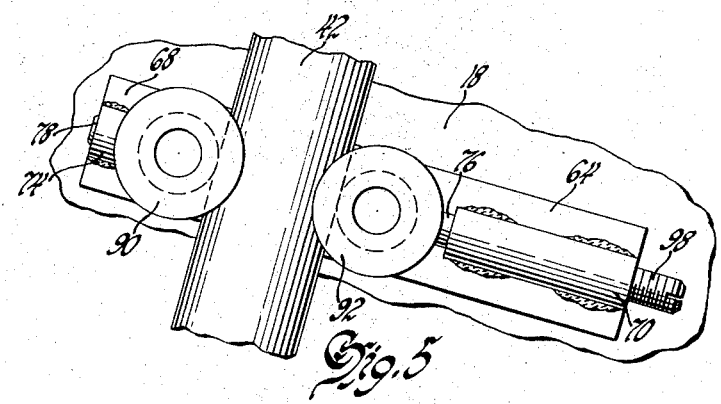
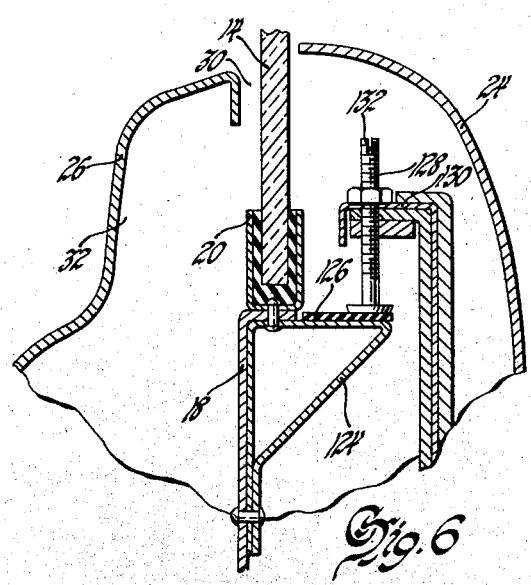
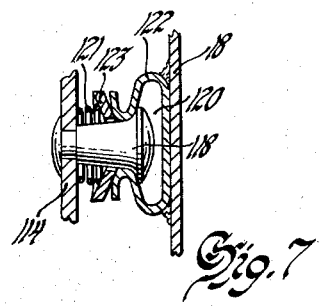

2,798,761

WINDOW REGULATOR

John Himka, Detroit, Mich., assignor to General Motors Corporation, Detroit, Mich., a corporation of Delaware Application January 20, 1954, Serial No. 405,087

3 Claims. (Cl. 296—44.5)

This invention relates to window regulators and in particular to window regulators adapted to raise and lower curved window glass members.

In the past automotive and other vehicles have had movable window glass members which were flat and plane surfaced. The raising or lowering of such members from within vehicle doors or side panels merely involves concern for their vertical movement. Automotive designs now make it desirable to be able to use curved glass members in vehicle doors, windshields, and back lights which members may blend in more smoothly with body panel contours. Vertical movement alone of a curved glass member would require an opening in a receiving structure of a width equal to the curvature of the glass. This would present serious weather sealing problems. Although an extended track formed in the receiving structure and curved to complement the member might prove satisfactory such means would limit design flexibility in vehicle doors as well as standardize their thickness or at least their curvature.

It is now proposed to provide a window regulator which is adapted to move a curved window glass member into a closed position in conformance with the contours of the receiving structure and which will lower such curved member through an opening no larger than the thickness of the glass to within a housing structure. The housing structure itself need provide a space only wide enough to accommodate the curvature of the glass. It is further provided that such curved glass member may be moved along guide rails or tracks whose curvature need not complement its own, thereby enabling the glass to be curved in one direction and the guide member and the panel to which they are secured to be oppositely curved. It is still further proposed to provide a guide follower which may be associated with the movable glass member and which will hold the glass in rattle-free engagement with the guide members formed to define the travel of such glass member.

In the drawings:

Figure 1 shows a fragmentary view of an automobile having the proposed window regulating mechanism incorporated within the door panel. Figure 1 is a view taken in the plane of line 1—1 of Figure 2 in the direction of the arrows thereon.

Figure 2 is a cross sectional view taken in the plane of line 2—2 of Figure 1 and viewed in the direction of the arrows thereon.

Figure 3 is an enlargement of Figure 2 to show certain pertinent features in more detail.

Figure 4 is a cross sectional view of the guide members as taken in the plane of line 4—4 of Figure 1 and viewed in the direction of the arrows thereon.

Figure 5 is a front view of the guide engaging members as shown in Figure 3 taken in the plane of line 5—5 and as viewed in the direction of the arrows thereon.

Figure 6 is a cross sectional view of the window stop device shown in Figure 1 taken in the plane of line 6—6 and viewed in the direction of the arrows thereon.

Figure 7 is a cross sectional view of the slidable connection between the connecting arm of the window lift means and the window frame as viewed in the plane of line 7—7 of Figure 1 in the direction of the arrows thereon.

There is shown in Figure 1 a fragmentary view of a vehicle body 10 having a door 12 which in this instance has the outer panel removed to more clearly show the window regulating mechanism housed within the door. A curved window glass member 14 is secured within a mounting frame 16 including a base plate 18, a channeled member 20 receiving the lower extremity of the glass member 14, and another channel member 22 preferable of chrome or other ornamental metal receiving the leading edge of the glass. The glass 14 is curved about a horizontal axis and in the present instance has no vertical curvature.

The vehicle door includes inner and outer panels 24 and 26 closed off at their sides and at their bottom as by member 28. An elongated opening 30 of a width substantially equal to that of the thickness of the glass member is provided along the top of the door 12 between the panels 24 and 26 for access to the window receiving chamber 32 within which the glass member 14 and its regulating mechanism are adapted to be housed.

A backing plate 34 is secured as by fasteners 36 to the inner door panel 24 and all of the window regulating mechanism is adapted to be secured thereto. This enables the complete assembly of the mechanism prior to installation within the vehicle door 12. Guide rails or tracks 38, 40 and 42 are secured to the backing plate 34 as by brackets 44 and 46. While bracket 44 has the guide rail 40 welded thereto as at 48 and its upper end secured as at 50 the other brackets 46 have a single fastening pin 52 to enable limited freedom of movement until their upper ends are properly positioned and secured to the backing plate 34 as by bolts 54. The rails 38 and 42 are plain bars with rounded edges while the rail 40 is channeled. Bumper elements 43 are secured to the ends of the rails to cushion the base plate 18 when received thereon as shown in phantom at 45.

The base plate 18, forming part of the mounting frame receiving the glass member 14, has its edges turned as shown in Figures 2 and 3, at 56 and 57, to provide greater plate strength. Secured to the base plate 18 are guide rail followers 58 one of which is shown in Figure 4. The follower 58 includes a plate 60 secured to the base plate 18 by bolts 62 and having spacers or shims 64, 66 and 68 secured thereto. The shims 64, 66 and 68 have tubular members 70, 72 and 74 respectively secured thereto and spaced apart to receive stub shafts or pivotal pins 76 and 78. Collars 80 and 82 formed on the pins 76 and 78 have shafts 84 and 86 secured thereto. The shafts 84 and 86 are adapted to receive rollers 90 and 92 for rotation and have rivet-like heads 88. A sleeve 94 provided centrally within each roller is offset to receive the rivet-like head 88 of the shafts 84 and 86 within the rollers 90 and 92 and to provide a shoulder 96 to hold the rollers away from the collars 80 and 82. The tubular member 70 has a set screw 98 threaded in one end and a spring 100 disposed within the member and engaging the end of the pivotal pin 76.

When the rollers 90 and 92 engage one of the guide rails 38 or 42 the roller 90 is spring loaded against the spring 100. The rollers 90 and 92 have limited axial movement between the rivet head 88 and sleeve shoulder 96, have pivotal movement about the axis of pins 76 and 78 and have relative movement to insure constant rattle-free engagement with the guide rails 38 or 42 by means of the spring 100.

Aside from the guide followers 58 engaging the guide rails 38 and 42 there is a roller 102 secured to the plate 18 as at 104 which is received within the channeled guide 40.

A mounting plate 106 is secured to the backing plate 34 for receiving a small electrical motor 108 and a worm gear housing 110. A rack sector 112 is pivotally mounted on the mounting plate 106 for engagement with the worm gear (not shown) of the worm housing 110. A drive or connecting arm 114 is secured to the rack sector 112 and has its outer end engaging the base plate 18. The connecting arm 114 is hinged as at 116 and slightly bowed to enable greater mounting flexibility in that the rack sector 112 need not necessarily be disposed in the same plane as the base plate 18. A coil spring 117 associated with the connecting arm 114 is adapted to assist movement of the arm in raising and lowering the glass 14.

A knob 118 secured to the end of the connecting arm 114 is engaged within the channeled section 120 of a bracket 122 secured to the base plate 18. The knob 118 is adapted to slide back and forth within the channeled section as the window 14 is raised and lowered. A spring 121 and a spring collar 123 are associated with the knob 118 to assure rattle-free engagement.

A stop 124 is secured to the base plate 18 adjacent the lower extremity of the glass member 14 and is provided with a rubber cushioned seat 126. A screw 128 is threaded through a flanged portion 130 of the backing plate 34 and is adapted to engage the stop 124 to limit the upward travel of the base plate 18 and consequently the glass member 14. The screw 128 may be adjusted as at 132.

The window regulating mechanism as mounted within the vehicle door 12 is adapted to operate as follows: In the housed position the base plate 18 lies against the bumper elements 43 as shown in phantom at 45 with the curved glass member 14 disposed between the door panels 24 and 26. The electric motor 108 drives the rack sector 112 to move the connecting arm 114 engaged within the channeled bracket 122. As the connecting arm 114 is raised the base plate 18 is caused to follow the path defined by the guide rails 38, 40, and 42 by the guide followers 58 and roller 102 secured to the plate. The guide rails are secured to the door panel 26 and are curved in conformance with the panel rather than the glass member 14. As the glass 14 is raised the guide followers are adapted to pivot about pins 76 and 78 to allow the glass to move freely through the opening 30 in the top of the door 12. As mentioned there is a slight degree of universal movement allowed the rollers 90 and 92 so that vertical movement of the glass 14 is not restrained to pure vertical movement but may adapt itself within limits to pass through the opening without adverse strain on its sides.

The guide rails 38, 40 and 42 are formed to define a specific path of movement of the glass member 14 in attaining its closed or raised position. Inasmuch as this requires slight curvature in the plane of the rail the cross section is larger at such areas. The rollers 90 and 92 are however relatively movable against the action of spring 100 and thereby enable following the guide members 38 and 42 in rattle-free engagement throughout the length of the members.

In the raised position the stop 124 is engaged by the screw 128 limiting the travel of the glass 14. The base plate 18 and the channel member 20 are disposed within the door 12 out of sight. The glass 14 is lowered by a reversal of the operation described with the bumper elements 43 acting as stops in the housed position.

I claim:

1. A guide follower adapted to be secured to a movable member and arranged for engagement with a guide rail, said follower including a pair of rotatable pins having transverse shafts secured thereto, rollers disposed for rotation upon said shafts, said rollers being adapted to engage opposite sides of said guide rail, and spring means associated with one of said pins for holding said rollers in spring biased engagement against the sides of said rail, said movable member being pivotally movable about said pins to enable following said guide rails while having relative freedom of movement in a transverse plane to that of travel.

2. Guide means for use with a member adapted to be moved relative to a stationary member through a defined path of travel, said guide means including a guide rail secured to one of said members and a guide follower secured to the other of said members, said guide follower comprising pivotally mounted shafts having rollers mounted thereon for rotation and spaced apart to receive said guide rail therebetween, one of said rollers being spring biased towards the other roller to allow for relative movement therebetween and constant engagement of said rollers with said guide rail.

3. Guide means for use with a member adapted to be moved relative to a stationary member through a defined path of travel, said guide means including a guide rail secured to one of said members, and a guide follower secured to the other of said members, said guide follower comprising pivotally mounted shafts having rollers mounted thereon for rotation and spaced apart to receive said guide rail therebetween, said movable member having freedom of pivotal movement about said guide followers during movement along said guide rails.

References Cited in the file of this patent

UNITED STATES PATENTS

| | | |
|---|---|---|
| 2,059,027 | Potter | Oct. 27, 1936 |
| 2,131,745 | Morrison | Oct. 4, 1938 |
| 2,390,271 | Rappl et al. | Dec. 4, 1945 |
| 2,632,668 | Keller | Mar. 24, 1953 |
| 2,714,035 | Limberg | July 26, 1955 |